United States Patent
Yu et al.

(10) Patent No.: US 7,455,802 B2
(45) Date of Patent: *Nov. 25, 2008

(54) STRESS RELEASE METHOD AND APPARATUS

(75) Inventors: Robert C. U. Yu, Webster, NY (US);
John J. Darcy, Webster, NY (US);
Michael S. Roetker, Webster, NY (US);
Scott Griffin, Webster, NY (US); Felix J. Santana, Webster, NY (US);
Satchidanand Mishra, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 695 days.

This patent is subject to a terminal disclaimer.

(21) Appl. No.: 10/743,179

(22) Filed: Dec. 23, 2003

(65) Prior Publication Data

US 2005/0133965 A1    Jun. 23, 2005

(51) Int. Cl.
*B29C 53/00*    (2006.01)
*B29C 53/84*    (2006.01)
*B29C 35/00*    (2006.01)
*G03G 15/00*    (2006.01)

(52) U.S. Cl. .................. 264/285; 264/493; 264/346; 264/348

(58) Field of Classification Search .............. 264/495, 264/493, 476, 285, 210.7, 210.1, 342 R, 342 RE, 264/346, 348
See application file for complete search history.

(56) References Cited

U.S. PATENT DOCUMENTS

| | | |
|---|---|---|
| 3,121,006 A | 2/1964 | Middleton et al. |
| 4,233,384 A | 11/1980 | Turner et al. |
| 4,265,990 A | 5/1981 | Stolka et al. |
| 4,286,033 A | 8/1981 | Neyhart et al. |
| 4,291,110 A | 9/1981 | Lee |
| 4,291,505 A * | 9/1981 | Taniishi et al. ............... 451/49 |
| 4,299,897 A | 11/1981 | Stolka et al. |
| 4,306,008 A | 12/1981 | Pai et al. |

(Continued)

FOREIGN PATENT DOCUMENTS

DE    28 33 189    *    1/1980

OTHER PUBLICATIONS

U.S. Appl. No. 10/385,409, filed Mar. 7, 2003, Yu et al.

*Primary Examiner*—Matthew J. Daniels
(74) *Attorney, Agent, or Firm*—Oliff & Berridge, PLC

(57) ABSTRACT

A stress/strain relief process for a flexible, multilayered web stock includes providing a multilayered web stock including at least one layer to be treated, the at least one layer to be treated having a coefficient of thermal expansion significantly differing from a coefficient of thermal expansion of another layer; passing the multilayered web stock over and in contact with a first wrinkle-reducing roller that spontaneously creates transverse tension stress in the at least one layer to be treated; heating at least the at least one layer to be treated above a glass transition temperature $T_g$ of the at least one layer to be treated to thereby create a heated portion of the at least one layer to be treated, a portion of the web stock in proximity to the heated portion of the at least one layer to be treated thereby becoming a heated portion of the web stock; inducing curvature in the heated portion of the web stock; and cooling the heated portion of the web stock at said curvature.

24 Claims, 6 Drawing Sheets

U.S. PATENT DOCUMENTS

| | | |
|---|---|---|
| 4,338,387 A | 7/1982 | Hewitt |
| 4,439,507 A | 3/1984 | Pan et al. |
| 4,587,189 A | 5/1986 | Hor et al. |
| 4,664,995 A | 5/1987 | Horgan et al. |
| 4,983,481 A | 1/1991 | Yu |
| 5,089,369 A | 2/1992 | Yu |
| 5,167,987 A | 12/1992 | Yu |
| 5,240,532 A * | 8/1993 | Yu .............................. 156/137 |
| 5,606,396 A | 2/1997 | Yu et al. |
| 5,688,355 A | 11/1997 | Yu |
| 6,068,722 A * | 5/2000 | Yu et al. ...................... 156/137 |
| 6,277,534 B1 * | 8/2001 | Foltz et al. .................... 430/56 |
| 2003/0067097 A1 | 4/2003 | Yu et al. |

* cited by examiner

STRESS RELEASE METHOD AND APPARATUS

BACKGROUND OF THE INVENTION

1. Field of Invention

The invention relates to treatment methods for a flexible multi-layered electrostatographic imaging member, such as web stock. In particular, the invention relates to an improved stress relief treatment process for flexible imaging member web stock to impart mechanical service life extension.

2. Description of Related Art

Flexible electrostatographic imaging members are well known in the electrostatographic marking art. Typical flexible electrostatographic imaging members include, for example, (1) electrophotographic imaging members (photoreceptors) commonly utilized in electrophotographic (xerographic) processing systems and (2) electroreceptors, such as ionographic imaging members for electrographic imaging systems. The flexible electrostatographic imaging members can be in the form of seamless or seamed belts. Typical electrophotographic imaging member belts comprise a charge transport layer and a charge generating layer on one side of a supporting substrate layer and an anticurl back coating applied to the opposite side of the supporting substrate layer to induce flatness. Electrographic imaging member belts, however, typically have a more simple material structure, including a dielectric imaging layer on one side of a supporting substrate and an anticurl back coating on the opposite side of the substrate. While the scope of embodiments covers an improved preparation process for flexible electrostatographic imaging members producing a crack resistance enhanced outer top imaging layer, the following discussion will focus only on processing of flexible electrophotographic imaging members for simplicity.

Electrophotographic flexible imaging members typically comprise a photoconductive layer, which can include a single layer or composite layers. Since typical electrophotographic imaging members can exhibit undesirable upward imaging member curling, the anticurl back coating brings each imaging member to at least a desired flatness.

One type of composite photoconductive layer used in electrophotography, illustrated in U.S. Pat. No. 4,265,990, for example, the disclosure of which is hereby incorporated by reference, has at least two electrically operative layers. One layer comprises a photoconductive layer that can photogenerate holes and inject the holes into a contiguous charge transport layer. Generally, where the two electrically operative layers are supported on a conductive layer with the photoconductive layer sandwiched between the contiguous charge transport layer and the conductive layer, the outer surface of the charge transport layer is normally charged with a uniform charge of a negative polarity and the supporting electrode is utilized as an anode. The supporting electrode can still function as an anode when the charge transport layer is sandwiched between the supporting electrode and the photoconductive layer. The charge transport layer in this case must be able to support the injection of photogenerated electrons from the photoconductive layer and to transport the electrons through the charge transport layer. Photosensitive members having at least two electrically operative layers can provide excellent electrostatic latent images when charged with a uniform negative electrostatic charge, exposed to a light image and thereafter developed with finely divided electroscopic marking particles. The resulting toner image is usually transferred to a suitable receiving member, such as paper.

As more advanced, higher speed electrophotographic copiers, duplicators and printers were developed, degradation of image quality was encountered during extended cycling. Moreover, complex, highly sophisticated duplicating and printing systems operating at very high speeds have created stringent requirements including narrow operating limits on photoreceptors. For flexible electrophotographic imaging members having a belt configuration, the numerous layers found in modern photoconductive imaging members must be highly flexible, adhere well to adjacent layers, and exhibit predictable electrical characteristics within narrow operating limits to provide excellent toner images over many thousands of cycles. One type of multilayered photoreceptor belt that has been employed as a belt in negatively charging electrophotographic imaging systems comprises a substrate, a conductive layer, a blocking layer, an adhesive layer, a charge generating layer, a charge transport layer, and a conductive ground strip layer adjacent to one edge of the imaging layers. This photoreceptor belt can also comprise additional layers, such as an anticurl back coating to balance curl and provide the desired belt flatness.

In a machine service environment, a flexible multilayered photoreceptor belt, mounted on a belt supporting module that includes a number of support rollers, is generally exposed to repetitive electrophotographic image cycling, which subjects the outer-most charge transport layer to mechanical fatigue as the imaging member belt bends and flexes over the belt drive roller and all other belt module support rollers. The outermost layer also experiences bending strain as the backside of the belt makes sliding and/or bending contact above each backer bar's curving surface. This repetitive action of belt cycling leads to a gradual deterioration in the physical/mechanical integrity of the exposed outer charge transport layer, leading to premature onset of fatigue charge transport layer cracking. The cracks developed in the charge transport layer as a result of dynamic belt fatiguing are found to manifest themselves into copy print defects, which thereby adversely affect the image quality on the receiving paper. In essence, the appearance of charge transport cracking cuts short the imaging member belt's intended functional life.

When a production web stock consisting of several thousand feet of coated multilayered photoreceptor is obtained after finishing the charge transport layer coating/drying process, it is seen to spontaneously curl upwardly. Hence, the anticurl back coating is applied to the backside of the substrate support, opposite to the side having the charge transport layer, to counteract the curl and render the photoreceptor web stock flatness. The exhibition of upward photoreceptor curling after completion of charge transport layer coating results from thermal contraction mismatch between the applied charge transport layer and the substrate support under the conditions of elevated temperature heating/drying the wet coating and eventual cooling down to room ambient temperature. Since the charge transport layer in a typical photoreceptor device has a coefficient of thermal contraction approximately 2 to 5 times larger than that of the substrate support, upon cooling down to room ambient, greater dimensional contraction occurs in the charge transport layer than in the substrate support. This yields the upward photoreceptor curling of the web stock.

Although, in a typical photoreceptor belt, it is necessary to apply an anticurl back coating to complete a typical photoreceptor web stock material package having the desired flatness, nonetheless the application of the anticurl back coating onto the backside of the substrate support (for counter-acting the upward curling and render photoreceptor web stock flatness) has caused the charge transport layer to instantaneously build-in an internal tension strain of from about 0.15% to about 0.35% in its coating material matrix. After converting the production web stock into seamed photoreceptor belts, the internal built-in strain in the charge transport layer is then cumulatively added to each photoreceptor bending induced strain as the belt flexes over a variety of belt module support rollers during photoreceptor belt dynamic cyclic function in a machine. The consequence of this cumulative strain effect has been found to cause the acceleration and early onset of photoreceptor belt fatigue charge transport layer cracking problem. Moreover, the cumulative charge transport layer strain has also been identified as the origin of the formation of bands of charge transport layer cracking when the photoreceptor belt is parked over the belt support module during periods of machine idling or overnight and weekend shut-off time, as the belt is under constant airborne chemical vapor and contaminants exposure. The bands of charge transport layer cracking are formed at the sites corresponding to photoreceptor belt bending over each of the belt supporting rollers. The crack intensity is also seen to be most pronounced for the band at the belt segment bent and parked directly over the smallest roller, since according to the fundamentals of material mechanics, the smaller the roller diameter the belt segment is bent over, the greater is the bending strain is induced in the charge transport layer surface.

Thus, there is a need for a method of fabrication of improved flexible seamed photoreceptor belts, having a charge transport layer with little or no built-in internal tension and reduced bending strain as the belts flex during machine function or during static bent belt parking over the belt module support rollers under the periods of machine idling and shut-off. Such belts will enjoy extended mechanical functioning life and effect the suppression of premature onset of charge transport layer cracking problem as well.

U.S. Patent Publication No. 20030067097, U.S. patent application Ser. No. 10/385,409, and U.S. Pat. Nos. 5,606, 396, 5,089,369, 5,167,987, and 4,983,481, the disclosures of which are hereby incorporated by reference, represent prior efforts toward alleviating the problems discussed above. Although these efforts were successful to a point, however, resolution of one problem had often been found to create new ones. For example, the processing disclosed in the above-described applications have been found to introduce a new problem of copy streak printout defect issue.

Thus, there is a continued need to improve the methodology for cost effectual production of flexible imaging members, particularly through innovative processing treatment approaches that effect charge transport layer internal tension strain reduction or elimination, as well as reduction the bending/flexing strain over belt module support rollers, in multi-layered electrophotographic imaging member web stocks to yield mechanically robust imaging member belts to meet future machine imaging member belt life extension need.

SUMMARY OF THE INVENTION

Embodiments thus provide improved methodology for fabricating multiple layered electrophotographic imaging member web stocks that overcome the above noted deficiencies. For example, embodiments provide an improved process for carrying out flexible electrophotographic imaging member web stocks treatment. Additionally, embodiments provide an improved and refined methodology for processing flexible multilayered electrophotographic imaging member web stocks to effect reduction of charge transport layer internal strain. Advantageously, embodiments provide an improved and refined methodology for processing flexible multilayered electrophotographic imaging member web stocks to effect reduction of charge transport layer bending strain that is induced when imaging member belt flexes or parking over belt support rollers to thereby extend the mechanical service life of the imaging member.

An improved flexible multilayered electrophotographic imaging member web stock results from embodiments. Such web stock has a charge transport layer with reduction of both internal and bending strains for effectual suppression of early onset of imaging member belt charge transport layer cracking problem caused by dynamic belt fatigue during machine belt function or induced as a result of chemical contaminants exposure at the period belt parking when machine idling or shut-off.

Although various methods for heat stress release are known in the art, as described above, there continues to exist a need for improved stress release methods, to provide improved multi-layer members for use in imaging methods. The present invention thus addresses these needs by providing an improved method that provides effectual increase of heat stress release result, to thereby providing increased of mechanical functioning lifetime to the multi-layer imaging member belts which are totally free of the streak defects copy printout problem associated with all the prior art stress release processes.

Embodiments thus provide an improved treatment process for carrying out multilayered flexible electrophotographic imaging member web stock charge transport layer internal stress reduction that effects the elimination of the need of an anticurl back coating from the imaging member. Additionally, embodiments provide an improved flexible multilayered electrophotographic imaging member web stock having a strain/stress reduction charge transport layer through implementation of invention cost effective web stock stress-releasing treatment production process. A typical electrophotographic imaging member web stock comprises a flexible substrate support layer coated over with an electrically conductive ground plane, a hole blocking layer, an optional adhesive layer, a charge generating layer, a charge transport layer, and an anticurl back coating.

A stress-release process of the present invention has improved and refined features for imparting effectual heat treatment of electrophotographic imaging member web stock to substantially eliminate the internal tension strain from the charge transport layer material matrix, as well as to reduce bending strain prior to fabrication into flexible imaging member belts without the streak defects associated copy printout problem. To achieve this invention purpose, embodiments disclosing an improved stress-release process with innovative refinement that overcomes the prior art shortfall have been successfully demonstrated and implemented for imaging member production processing application. In detail, the imaging member web stock is directed, with the transport layer facing outwardly, to pass over and in contact with the surface of a selected roller that creates a spontaneous transverse tension expanding the member in perpendicular direction of the web stock prior to its speeding toward the surface of a circular metallic tube making entering contact at 12 o'clock with a heat stress release treatment tube, heating the transport layer surface to a temperature above its glass transition temperature ($T_g$), then cooling the web stock to a temperature below the Tg just before the web stock leaves the tube to complete imaging member web stock stress release processing treatment. The web stock transverse direction expansion created by the selected roller positioned before the heat stress release treatment tube provides a counter effect to offset and suppress web stock micro ripple formation induced by the treatment tube. The selected roller for stress release processing application has specific physical attributes that are capable of generating the traverse web tension needed to fulfill the present invention purpose.

Alternatively, an embodiment of the stress release process of the present invention positions the selected roller described in the above treatment process at the vicinity immediately after the heat treatment tube. In this manner, the micro-ripples induced in the web stock will be stretched out and eliminated by the transverse tension force.

For achieving best electrophotographic imaging member stress release outcome, embodiments of the present invention demonstrate a stress release process that includes placing a selected roller right before and another selected roller immediately after the heat treatment tube, which yields imaging member web stock having best result.

The stress release treated flexible electrophotographic imaging member web stock is then formed into seamed flexible belts that generally comprise a flexible supporting substrate having an electrically conductive surface layer, an optional hole blocking layer, an optional adhesive layer, a charge generating layer, a charge transport layer, a ground strip layer, and may or may not need an anticurl back coating. The flexible substrate support layer should be transparent, and can have a thickness of between about 25 µm and about 200 µm. A thickness in the range of from about 50 µm to about 125 micrometer gives better light transmission and substrate support layer flexibility. The conductive surface layer coated over the flexible substrate support can comprise any suitable electrically conductive material such as, for example, aluminum, titanium, nickel, chromium, copper, brass, stainless steel, silver, carbon black, graphite, and the like. The electrically conductive surface layer coated above the flexible substrate support layer may vary in thickness over a substantially wide ranges depending on the desired usage of the electrophotographic imaging member. However, from flexibility and partial light energy transmission considerations, the thickness of the conductive surface layer may be in a range from about 20 Å to about 750 Å. It is, nonetheless, desirable that the conductive surface layer coated over the flexible substrate support layer be between about 50 Å and 120 Å in thickness to provide sufficient light energy transmission of at least 20% transmittance to allow effective imaging member belt back erase.

Although various methods for heat stress release are known in the art, as described above, there continues to exist a need for improved stress release methods, to provide improved multi-layer members for use in imaging methods. The present invention thus addresses these needs by providing an improved method that provides effectual increase of heat stress release result, to thereby provide an increase in mechanical functioning lifetime to the multi-layer imaging member belts which are totally free of the streak defects copy printout problem associated with all the prior art stress release processes.

In embodiments, the present invention provides an improved stress/strain relief process for a flexible, multilayered web stock comprising:

providing a multilayered web stock including at least one layer to be treated, the at least one layer to be treated having a coefficient of thermal expansion significantly differing from a coefficient of thermal expansion of another layer;

passing the multilayered web stock over and in contact with a first wrinkle-reducing roller that spontaneously creates transverse tension stress in the at least one layer to be treated;

heating at least the at least one layer to be treated above a glass transition temperature $T_g$ of the at least one layer to be treated to thereby create a heated portion of the at least one layer to be treated, a portion of the web stock in proximity to the heated portion of the at least one layer to be treated thereby becoming a heated portion of the web stock;

inducing curvature in the heated portion of the web stock; and cooling the heated portion of the web stock at said curvature.

In another embodiment, the present invention provides an improved stress/strain relief process for a flexible, multilayered web stock including:

providing a multilayered web stock including at least one layer to be treated, the at least one layer to be treated having a coefficient of thermal expansion significantly differing from a coefficient of thermal expansion of another layer;

providing a first wrinkle-reducing roller;

moving the web stock toward the first wrinkle-reducing roller;

passing the multilayered web stock over and in contact with the first wrinkle-reducing roller to spontaneously create transverse tension stress in the at least one layer to be treated;

providing a processing tube having an arcuate outer surface;

moving the web stock toward the processing tube;

providing a heat source at the processing tube; and heating the web stock above a glass transition temperature $T_g$ of the at least one layer to be treated.

BRIEF DESCRIPTION OF THE DRAWINGS

A more complete understanding of the imaging device which subjected to the processing of the present invention treatment can be obtained by reference to the accompanying drawings wherein.

Figure 1:
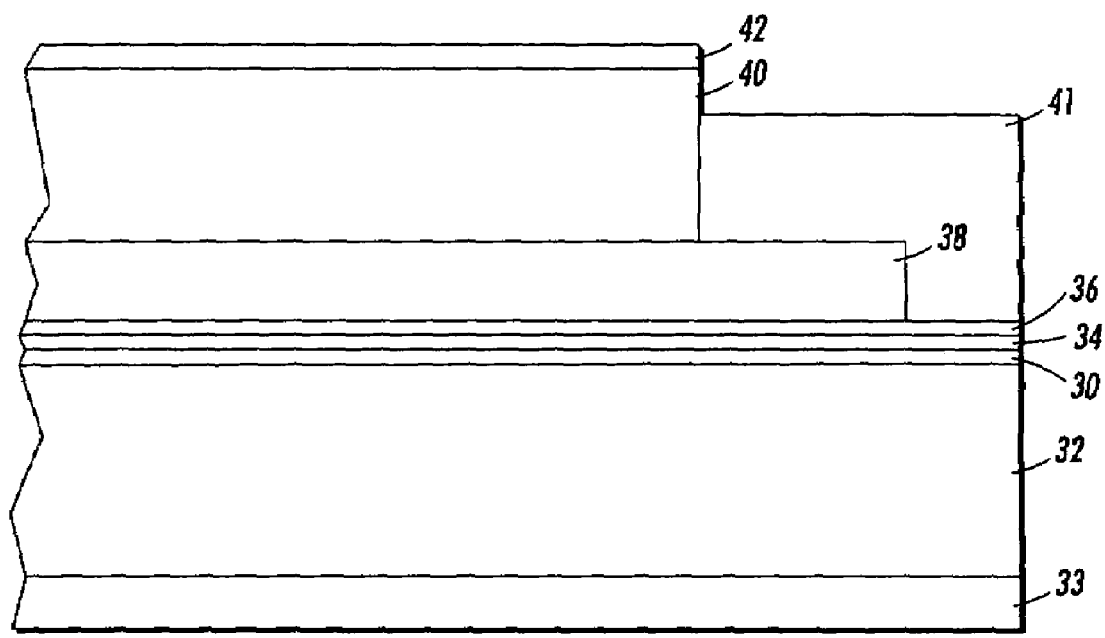
FIG. 1 illustrates a schematic partial cross-sectional view of a typical multiple layered flexible sheet of electrophotographic imaging member as seen along the width of the multilayer member.

In the drawings and the following description, like numeric designations refer to components of like function.

DETAILED DESCRIPTION OF EXEMPLARY EMBODIMENTS

For a general understanding of the present invention, reference is made to the drawings. In the drawings, like reference numerals have been used throughout to designate identical elements.

For the sake of convenience, the invention will only be described herein after for electrophotographic imaging members in flexible belt form even though this invention includes electrostatographic imaging members of different materials configuration. Although specific terms are used in the following description for the sake of clarity, these terms are intended to refer only to the particular structure of the invention selected for illustration in the drawings, and are not intended to define or limit the scope of the invention.

A typical, negatively charged, multilayered electrophotographic imaging member of flexible web stock configuration is illustrated in FIG. 1. Generally, such a member includes a substrate support layer 32 on which a conductive layer 30, a hole blocking layer 34, a photogenerating layer 38, and an active charge transport layer 40 are formed. An optional adhesive layer 36 can be applied to the hole blocking layer 34 before the photogenerating layer 38 is deposited. Other layers, such as a grounding strip layer 41 or an overcoat layer 42 can be applied to provide various characteristics, such as improve resistance to abrasion. On the opposite surface of substrate support 32, an anticurl backing layer 33 can be applied to reduce the curling induced by the different coefficients of thermal expansion of the various layers of the belt.

Belts prepared from the imaging member web stock of the type shown in FIG. 1 are generally well known in the art, as are materials appropriate for their formation. Examples of electrophotographic imaging members having at least two electrically operative layers, including a charge generator layer and diamine containing transport layer, are disclosed in U.S. Pat. Nos. 4,265,990, 4,233,384, 4,306,008, 4,299,897, and 4,439,507, and U.S. Patent Publication No. 20030067097, the disclosures thereof being incorporated herein in their entirety.

The thickness of the substrate support 32 can depend on factors including mechanical strength, flexibility, and economical considerations, and can reach, for example, a thickness of at least about 50 µm. A typical maximum thickness of about 150 µm can also be achieved, provided there are no adverse effects on the final electrophotographic imaging device. The substrate support 32 should not soluble in any of the solvents used in each coating layer solution, optically clear, and being thermally stable enable to stand up to a high temperature of about 150° C. A typical substrate support 32 used for the prior art imaging member fabrication has a thermal contraction coefficient ranging from about $1 \times 10^{-5}/°$ C. to about $3 \times 10^{-5}/°$ C. and with a Young's Modulus of between about $5 \times 10^5$ psi and about $7 \times 10^5$ psi. However, materials with other characteristics can be used as appropriate.

The conductive layer 30 can vary in thickness over substantially wide ranges depending on the optical transparency and flexibility desired for the electrophotographic imaging member. Accordingly, when a flexible electrophotographic imaging belt is desired, the thickness of the conductive layer can be between about 20 Å and about 750 Å, and more preferably between about 50 Å and about 200 Å for an optimum combination of electrical conductivity, flexibility and light transmission. The conductive layer 30 can be an electrically conductive metal layer formed, for example, on the substrate by any suitable coating technique. Alternatively, the entire substrate can be an electrically conductive metal, the outer surface thereof performing the function of an electrically conductive layer and a separate electrical conductive layer may be omitted.

After formation of an electrically conductive surface, the hole blocking layer 34 can be applied thereto. The blocking layer 34 can comprise nitrogen containing siloxanes or nitrogen containing titanium compounds as disclosed, for example, in U.S. Pat. Nos. 4,291,110, 4,338,387, 4,286,033, and 4,291,110, the disclosures of these patents being incorporated herein in their entirety.

An optional adhesive layer 36 can be applied to the hole blocking layer. Any suitable adhesive layer may be utilized, such as a linear saturated copolyester reaction product of four diacids and ethylene glycol. Any adhesive layer employed should be continuous and, preferably, have a dry thickness between about 200 µm and about 900 µm and, more preferably, between about 400 µm and about 700 µm. Any suitable solvent or solvent mixtures can be employed to form a coating solution of polyester. Any other suitable and conventional technique may be utilized to mix and thereafter apply the adhesive layer coating mixture of this invention to the charge blocking layer.

Any suitable photogenerating layer 38 can be applied to the blocking layer 34 or adhesive layer 36, if such an adhesive layer 36 is employed, which can thereafter be overcoated with a contiguous hole transport layer 40. Appropriate photogenerating layer materials are known in the art, such as benzimidazole perylene compositions described, for example in U.S. Pat. No. 4,587,189, the entire disclosure thereof being incorporated herein by reference. More than one composition can be employed where a photoconductive layer enhances or reduces the properties of the photogenerating layer. Other suitable photogenerating materials known in the art can also be used, if desired. Any suitable charge generating binder layer comprising photoconductive particles dispersed in a film forming binder can be used. Additionally, any suitable inactive resin materials can be employed in the photogenerating binder layer including those described, for example, in U.S. Pat. No. 3,121,006, the entire disclosure thereof being incorporated herein by reference.

The photogenerating layer 38 containing photoconductive compositions and/or pigments and the resinous binder material generally ranges in thickness of from about 0.1 µm to about 5 µm, is preferably to have a thickness of from about 0.3 micrometer to about 3 µm. The photogenerating layer thickness is related to binder content. Higher binder content compositions generally require thicker layers for photogeneration. Thicknesses outside these ranges can be selected providing the objectives of the present invention are achieved.

The active charge transport layer 40 can comprise any suitable activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. Thus, the active charge transport layer 40 can comprise any suitable transparent organic polymer or non-polymeric material capable of supporting the injection of photogenerated holes and electrons from the trigonal selenium binder layer and allowing the transport of these holes or electrons through the organic layer to selectively discharge the surface charge. The active charge transport layer 40 not only serves to transport holes or electrons, but also protects the photoconductive layer 38 from abrasion or chemical attack and therefore extends the operating life of the photoreceptor imaging member. The charge transport layer 40 should exhibit negligible, if any, discharge when exposed to a wavelength of light useful in xerography, for example, 4000 Å to 9000 Å. Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. The charge transport layer in conjunction with the generation layer in the instant invention is a material which is an insulator to the extent that an electrostatic charge placed on the transport layer is not conducted in the absence of illumination.

The charge transport layer forming mixture preferably comprises an aromatic amine compound. An especially preferred charge transport layer employed in one of the two electrically operative layers in the multi-layer photoconductor of this invention comprises from about 35 percent to about 45 percent by weight of at least one charge transporting aromatic amine compound, and about 65 percent to about 55 percent by weight of a polymeric film forming resin in which the aromatic amine is soluble. The substituents should be free form electron withdrawing groups such as $NO_2$ groups, CN groups, and the like, and are typically dispersed in an inactive resin binder.

The charge transport layer 40 should be an insulator to the extent that the electrostatic charge placed on the charge transport layer is not conducted in the absence of illumination at a rate sufficient to prevent formation and retention of an electrostatic latent image thereon. In general, the ratio of the thickness of the hole transport layer to the charge generator layer is preferably maintained from about 2.1 to 200:1 and in some instances as great as 400:1. Generally, the thickness of the transport layer 40 is between about 5 µm and about 100 µm, but thickness outside this range can also be used provided that there are no adverse effects. Typically, it has a Young's Modulus in the range of from about $2.5 \times 10^5$ psi to about $4.5 \times 10^5$ psi and with a thermal contraction coefficient of between about $6 \times 10^{-5}/°$ C. and about $8 \times 10^{-5}/°$ C. Furthermore, the charge transport layer also typically has a glass transition temperature $T_g$ of between about 75° C. and about 100° C.

Other layers, such as conventional ground strip layer 41 comprising, for example, conductive particles dispersed in a film forming binder may be applied to one edge of the photoreceptor in contact with the conductive layer 30, hole blocking layer, adhesive layer 36 or charge generating layer 38. The ground strip 41 can comprise any suitable film forming polymer binder and electrically conductive particles. Typical ground strip materials include those enumerated in U.S. Pat. No. 4,664,995. The ground strip layer 41 may have a thickness from about 7 µm to about 42 µm, and preferably from about 14 µm to about 23 µm. Optionally, an overcoat layer 42, if desired, can also be utilized to improve resistance and provide protection to imaging member surface abrasion.

The charge transport layer 40 typically has a great thermal contraction mismatch compared to that of the substrate support 32. As a result, the prepared flexible electrophotographic imaging member exhibits spontaneous upward curling due to the result of larger dimensional contraction in the charge transport layer than the substrate support, especially as the imaging member cools down to room ambient after the heating/drying processes of the applied wet charge transport layer coating. An anti-curl back coating 33 can be applied to the back side of the substrate support 32 (which is the side opposite the side bearing the electrically active coating layers) to induce flatness. The anticurl back coating 33 can comprise any suitable organic or inorganic film forming polymers that are electrically insulating or slightly semi-conductive.

The anticurl back coating 33 should have a thermal contraction coefficient of at least about $1 \times 10^{-5}/°$ C greater than that of the substrate support to be considered satisfactory. Typically, a substrate support has a thermal contraction coefficient of about $2 \times 10^{-5}/°$ C. However, anti-curl back coating with a thermal contraction coefficient at least $+2 \times 10^{-5}/°$ C larger than that of the substrate support is preferred to produce an effective anti-curling result. The selection of a thermoplastic film forming polymer for the anti-curl back coating application has to be satisfying all the physical, mechanical, optical, and importantly, the thermal requirements above. Polymer materials which can meet these invention requirements include a variety of polymers as is known in the art. These polymers can be block, random or alternating copolymers. Furthermore, the selected film forming thermoplastic polymer for anticurl back coating 33 application, if desired, can be of the same binder polymer used in the charge transport layer 40.

The fabricated multilayered, flexible electrophotographic imaging member web stock of FIG. 1 is then cut into rectangular sheets and converted into imaging member belts. The two opposite edges of each imaging member cut sheet are then brought together by overlapping and may be joined by any suitable method, including ultrasonic welding, gluing, taping, stapling, and pressure and heat fusing to form a continuous imaging member seamed belt, sleeve, or cylinder. From the viewpoint of considerations such as ease of belt fabrication, short operation cycle time, and mechanical strength of the fabricated joint, the ultrasonic welding process is more advantageous. The prepared flexible imaging belt can therefore be employed in any suitable and conventional electrophotographic imaging process that utilizes uniform charging prior to imagewise exposure to activating electromagnetic radiation.

As known from the principles of material mechanics, as the flexible imaging member seamed belt bends over the exterior surfaces of rollers of a belt module within an electrophotographic imaging machine during dynamic belt cycling function, the bottom surface of the anticurl back coating 33 of the flexible imaging member belt is compressed. In contrast, the top surface of charge transport layer 40 is stretched and placed under tension. This is attributable to the fact that the top and bottom surfaces move in a circular path about the circular roller. Since the top surface of charge transport layer 40 is at greater radial distance from the center of the circular roller than the bottom surface of anticurl back coating 33, the top surface must travel a greater distance than the bottom surface in the same time period. Therefore, the top surface must be under tension relative to a generally central portion of the flexible imaging member seamed belt (the portion of the flexible imaging member seamed belt generally extending along the center of gravity of the flexible imaging member seamed belt). Likewise, the bottom surface must be compressed relative to the generally central portion of the flexible imaging member seamed belt (the portion of the flexible imaging member seamed belt generally extending along the center of gravity of the flexible imaging member seamed belt). Consequently, the bending stress at the belt top surface will be tension stress, and the bending stress at the belt bottom surface will be compression stress as the imaging member belt flexes over each belt module support roller under a machine functioning condition.

From fracture mechanics, it is known that compression stresses, such as that at the bottom belt surface, rarely cause mechanical failure. Tension stresses, such as that induced at the top belt surface, however, are a more serious problem. The tension stress, under constant belt fatiguing condition, has been determined to be the root cause that promotes the development of charge transport layer 40 cracking problem. The cracks, though initiated in the charge transport layer 40, continue to propagate to the generator layer 38, extend to the adhesive interface layer 36, cut through the blocking layer 34, and reach further to the conductive layer 30.

However, multiple layer belts with significant difference between layer thermal contraction coefficients exhibit spontaneous upward imaging member curling, due in part to the dimensional contraction mismatch between these layers. The imaging members thus can require an anticurl back coating 33 applied to the back side of the substrate support layer 32 to balance the upward lifting force. This induces imaging member flatness prior to belt preparation, but yields belts with built-in internal strain. This internal strain can reach level of, for example, approximately 0.28%, and is additive to the bending strain induced during imaging member belt fatigue under machine operational conditions. The cumulative effect of internal strain plus bending strain further promotes the early onset of dynamic fatigue charge transport layer cracking during imaging member belt cyclic machine function. Moreover, bands of charge transport layer cracking caused by exposure to airborne chemical contaminants have also been found to form at imaging member belt segments parked/bent directly over each belt module support rollers over periods of machine idling and shut-off time.

Both dynamic belt fatigue and chemical contaminant exposure induced crackings in the charge transport layer 40 of the imaging member seamed belt are serious mechanical failures that should be resolved and/or avoided. These cracks manifest as copy printout defects, shortening the usefulness and service life of the flexible imaging member seamed belts.

Figure 2:
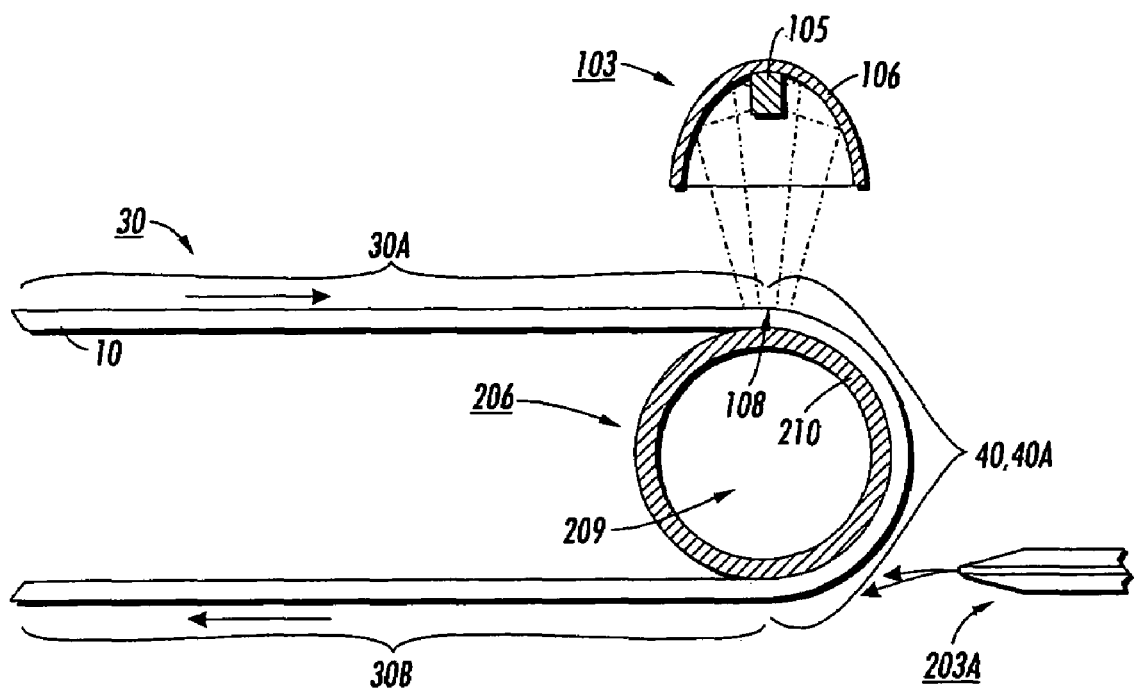
FIG. 2 shows a schematic representation of a prior art heat treatment processing employed to impart electrophotographic imaging member web stock charge transport layer stress release outcome.

To extend the charge transport layer cracking life, innovative imaging member web stock processing treatment has been successfully pursued and demonstrated to reduce the charge transport layer internal strain, as well as in reduction of imaging member belt bending strain over belt module support rollers, according to the exemplary stress-release processing representation of a prior art shown in FIG. 2. An electrophotographic imaging member having the material configuration shown in FIG. 1, unwound from, for example, a supplied roll-up web stock 10, and is directed with the charge transport layer facing outwardly, for example under a one pound per linear inch tension and a web stock transport speed of about 10 feet/min, toward a one-inch outer diameter free-rotation processing treatment metal tube 206 having an arcuate Teflon® coated outer surface 210, and an annulus 209 with passing cool water to maintain constant treatment tube temperature. The imaging member web stock 10 under 25° C. ambient, makes an entering contact at 12 o'clock with the tube 206 and is conformed to the arcuate surface 210. A powerful IR emitting tungsten halogen quartz heating source 103, positioned directly above, brings upon an instant localized temperature elevation to the charge transport layer to about 10° C. above its glass transition temperature ($T_g$) to facilitate molecular motion of the polymer in the layer and effect instant charge transport layer stress-release while the segment of the webstock is under bending conformance contact over the arcuate surface 210. The heat source 103 is an integrated unit having a length sufficiently covering the whole width of the imaging member web stock; it consists of a hemi-ellipsoidal cross-section elongated reflector 106 and a halogen quartz tube 105 positioned at one focal point inside the reflector 106 such that all the IR radiation energy emitted form tube 105 was reflected and converged at the other focal point outside the reflector 106 to give a 6 mm width focused heating region 108 that effects instant charge transport layer temperature elevation to beyond its $T_g$. The heated segment of charge transport layer after exposure to the heating region 108 began to cool down to below the $T_g$, through direct heat conduction to tube 206 and as well as heat transfer to ambient air, as the web stock in continuous motion is transported away from heat source 103. A further and final charge transport layer cooling is assured by air impingement from an air knife 203A (directing a high velocity, preferably super-sonic, narrow stream of cool air onto the surface of the web stock) positioned at 4 o'clock to tube 206 prior to the web stock segment emerging from the curved contacting zone region to complete the imaging member web stock stress-release treatment process. In this figure, the numerals 30, and 30A are paths where the transporting imaging member is freely suspended, while 40 and 40A are contact zones at which the segment of the imaging member is intimately riding over the treatment tube 206.

The material configuration of a typical electrophotographic imaging member web stock 10, like that shown in FIG. 1, used for the stress release processing treatment according to the illustrative representation of FIG. 2 comprises a 3.5 mils flexible substrate support layer 32, about 100 Angstrom thickness of the titanium conductive layer 30, a 0.02 micrometer hole blocking layer 34, a 0.03 micrometer adhesive layer 36, a 0.08 micrometer photogenerating layer 38, a 29 µm charge transport layer 40, a 18 micrometer conventional electrically conductive ground strip 41 coated along one edge of the imaging member web stock adjacent to the charge transport layer 40, and a 17 micrometer anticurl back coating 33 to give a complete imaging member web stock material package having reasonably good physical flexibility and flatness. With this imaging member web stock package, the processing treatment carried out though is seen to produce good charge transport layer stress releasing result, but unfortunately only found to have promoted the development of undesirable micro-ripple defect or wrinkling in its web stock direction (induced by the treatment tube 206) throughout the entire width of the imaging member webstock. The formation of web stock ripple diminishes the practical value of this prior treatment process, to thereby making it less attractive for electrophotographic imaging member production implementation consideration. The mechanism that causes the onset of ripple/wrinkle development may be qualitatively rationalized: As the web stock is transported over the treatment tube 206 and instantaneously heated to a high temperature above the Tg of the imaging member by exposure to the focus IR heating line 108, the web stock is free to expand in the web direction. However, transversal expansion is restricted by the contact friction between the surface of tube 206 and the back side of the imaging member web to accommodate the cross web dimension increase, which thereby results in web direction ripple/wrinkle lines formation.

The web stock ripples formed are minute in physical dimension and not notable to the naked eye, and thus could not be considered to be a cosmetic problem. Nevertheless, these ripples do manifest themselves into streak defects visible in the copy printouts. The streak defects are unacceptable copy quality degradation issues that require urgent resolution.

Figure 3:
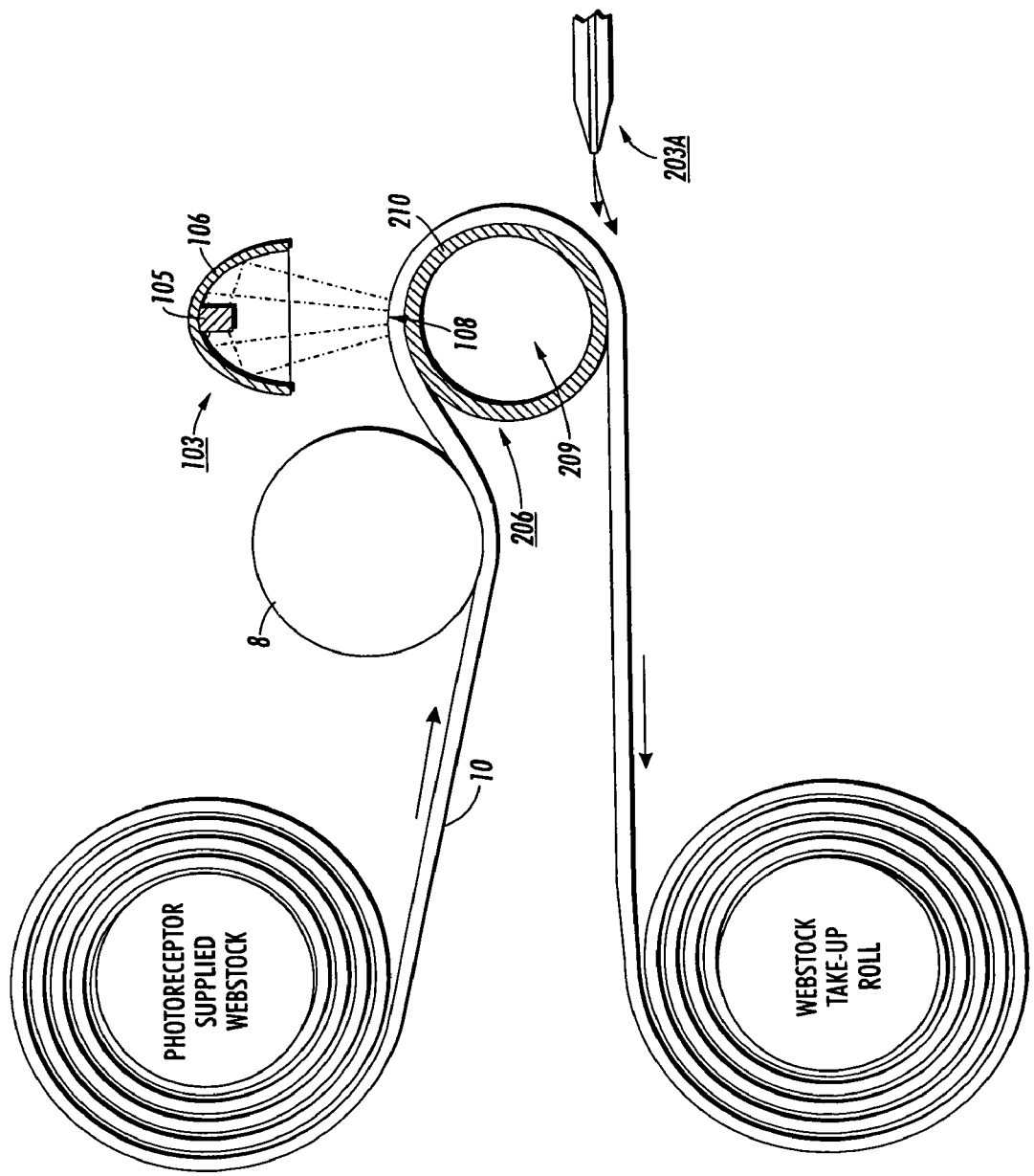
FIG. 3 shows a schematic representation of an embodiment of the present invention.

To overcome this deficiency, embodiments provide a modified treatment process with incorporation of refinement features that can provide effectual suppression or total elimination of the prior shortfall to give a ripple/wrinkle free stress release imaging member web stock. An embodiment of the present invention process that overcomes the problem of ripple/wrinkle development is shown in the schematic illustration of FIG. 3. The invention process of FIG. 3 represents an improvement with implementation of a refinement to the prior process illustrated in FIG. 2. To accomplish the invention purpose, the process in FIG. 2 is modified accordingly by incorporation of a selected roller 8 to support the imaging member web stock 10 in its transporting path. Roller 8 is added and inserted in a position between about 0.5 inch and about 7 inches in the nearby vicinity before heat treatment tube 206; however, a distance of between about 1 inch and about 4 inches is preferred, in embodiments. The selected roller 8 of the present invention process adaptation is required to have a specific physical attribute that is capable to create a transversal tension force toward the two edges of the imaging member 10, sufficiently enough to stretch out the web and thereby eliminate the root cause of web stock ripple/wrinkle development induced by the surface contact friction effect, arising between the top surface of tube 206 and the back side of the imaging member 10, that hinders cross web dimension thermal expansion when member 10 is heated to beyond the Tg.

FIG. 3 is an exemplary embodiment of a method and apparatus according to the present invention, which is useful for treating a flexible multi-layer member exhibiting a glass transition temperature and including a surface layer. As shown in FIG. 3, the imaging member webstock 10 moves toward a free rotating roller 8 and then toward the treatment component 206 (depicted in embodiments as a tube) having an arcuate outer surface 210, and a chamber 209. The annular chamber 209 of the treatment tube 206 can be accommodated with a passing air stream or with an alternatively coolant passing therethrough such as $CO_2$ snow, water liquid nitrogen, alcohol, or any suitable coolant. The wrapped angle made by the imaging member web stock 10 around roller 8 is preferably in a range of from about 10° to about 30°, although wrapped angles outside this range can be used, if desired. The member 10, which initially may be at ambient temperature of about 25° C., makes an entering contact at for example before or about 12 O'clock and conforms to the arcuate surface 210 of component 206. In FIG. 3, the arcuate surface is driven by the moving member 10, which causes the arcuate surface to rotate. Although the invention stress release treatment process illustrated in FIG. 3 shows that imaging member web stock 10 cooling is delivered by super sonic impinging air stream from air knife 203, other effective cooling strategies that can be used include, but are not limited to:

(1) the cooling air stream is first bubbled and passed through a water medium inside a container to bring along atomized liquid water mist to the air delivery knife 203A, such that the air stream impinging on the imaging member web stock can quickly be cooled down by the large heat extraction effect derived from both the large water heat capacity constant and its latent heat of evaporation.

(2) the air impingement cooling device can be replaced with a low durometer (about 10 Shore A hardness) soft free rotating silicone cooling nip-roller, having a frictionless rotating shaft, to impact quick imaging member web stock cooling and effect high speed treatment processing result, since solid conduction contact cooling is much more efficient than air stream cooling, since air is a relatively poor heat conductor. A water cooling bath can be used to quickly lower the temperature of the cooling roll. In such cases, the water cooling bath with partial submersed cooling silicone nip-roll, is controlled at a substantially constant temperature to ensure steady state treatment processing. Direct liquid water contacting an imaging member can weaken imaging member internal layer adhesion. However, since the cooling silicone nip-roller has a low surface energy of about 18 dynes/cm, direct liquid water wetting of the surface of imaging member web stock 10, brought upon by the silicone roller, is safely prevented. Furthermore, it is preferred that the soft silicone roller material matrix also contain metallic particle dispersion to increase its heat conduction capability.

(3) to enhance the cooling effect, the air knife 203A is provided with an impinging cooled air stream, liquid nitrogen, $CO_2$ snow, sub-cooled alcohol, low temperature cooling water, or another suitable coolant to accelerate the real time impact for quick imaging member web stock temperature lowering effect. In an alternate embodiment (not shown), the arcuate surface is non-rotatable.

In another embodiment of the present invention, the process also includes an effective stress release treatment roller but at a different location. In this embodiment (not shown), a roller 8 is positioned after the heat treatment tube 206 and at a distance between about 0.5 inch and about 7 inches from the heat treatment tube 206, to fulfill the intended web stock ripple/wrinkle elimination purpose. All of the details discussed above with respect to the roller 8 positioned before the heat treatment tube 206 apply equally to this embodiment, where the roller 8 is positioned after the heat treatment tube 206, and thus the details are not repeated here. The wrapped angle made by the imaging member web stock 10 around the roller 8 is again between about 10° and about 30°.

The present invention process provides member 10 with effectual stress release outcome in the charge transport layer by eliminating a tension strain ranging for example from about 0.9% to about 0.1%, particularly from about 0.6% to about 0.2% for mechanical function life extension. However, stress release for members having a tension strain outside these ranges can also be obtained, if desired.

The speed of the member as it moves along the member path ranges for example from about 1 ft/minute to about 90 ft/minute, particularly from about 5 ft/minute to about 40 ft/minute. However, speeds outside these ranges can also readily be processed, if desired.

Figure 5:
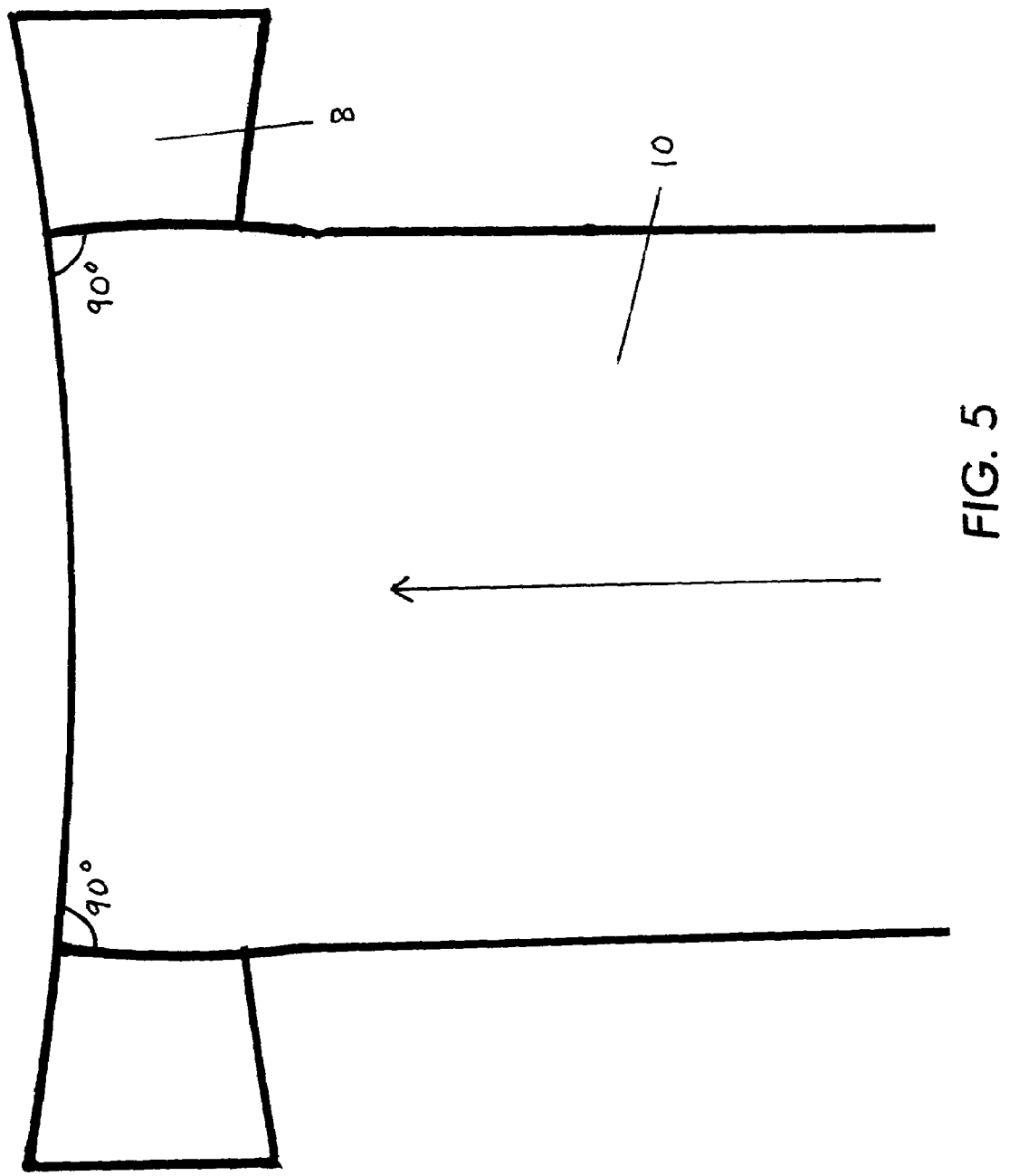
FIG. 5 illustrates a first embodiment of a selected roller adopted for the present invention.

A design of Roller 8 in a first embodiment of the invention is shown FIG. 5. As illustrated, roller 8 is a concave or reversed crown roller, which has an hour glass appearance shaped to have an outer diameter at both ends of between about 0.002 and about 0.1 inch larger than the diameter in the middle of the roller to yield satisfactory transversal direction stretching ripple/wrinkle suppression outcome. However, optimum result may be obtained for the diameter differential in the range of between about 0.005 and 0.02 inch, in embodiments. Since the fundamentals of web handling teach that a transporting imaging member web stock directed toward and making contact with a concave roller will make a 90° entry angle with the roller, as dictated by the Normal Entry Law, a transversal direction tension is spontaneously created to thereby stretch the imaging member outwardly toward the two web stock edges. The intensity of this cross web tension is created according to the radius of curvature of the concave roller. The middle diameter of the concave is from about 1 to about 4 inches; but of between about 1.5 and about 2 inches is most desirable. It is, in embodiments, preferable that the member 10 contacts the roller 8 on the upper or outer side of the material 10, i.e., the side of the material opposite any applied anti-curl layer. Thus, the material 10 contacts the roller on the side opposite the side that contacts the component 206. Prior to reaching the component 206 defining the arcuate surface, the member passes over and in contact with an appropriate wrinkle-reducing idled member or roller 8. Although the roller 8 can be driven to rotate at a desired speed, such as near or equal to the member transport speed, it is preferred in embodiments that the roller 8 be idled (i.e., freely rotatable and not actively driven other than by the passing member 10).

Figure 6:
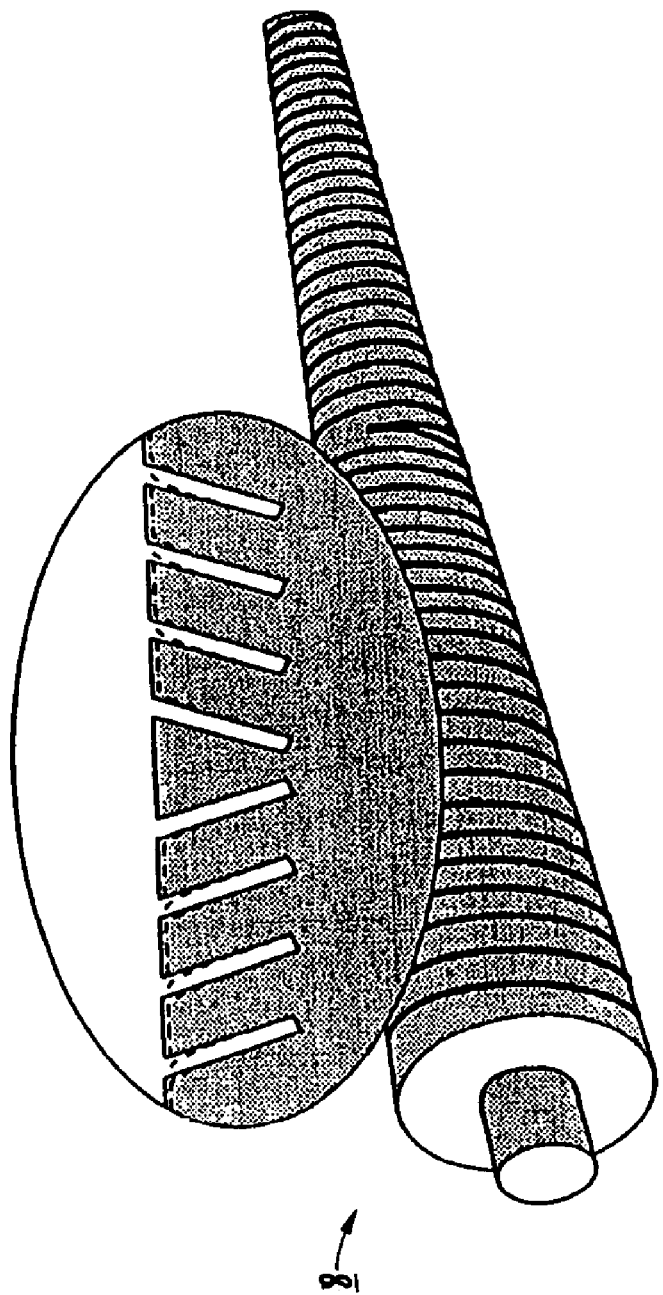
FIG. 6 illustrates another embodiment of a selected roller adopted for the present invention.

Alternatively, roller 8 may be of a totally different material and configuration design from that of FIG. 5. Illustrated in FIG. 6, is a free rotation flexible spreader roller 8 comprised of a rubber roller having a metal supporting axis. This spreader roller is cut to give a pattern of specific physical attribute that is capable of creating an outward transversal stretching effect from the center to both imaging member edges as the web stock is transported over and making contact with the spreader roller. The diameter of the spreader roller, in embodiments, is from about 0.8 to about 2 inches; preferably between about 1 and about 1.5 inches, although other diameters can be used, in embodiments.

As described above, embodiments of the present invention can be practiced by placing the roller 8 at a position either just before or just after the heat treatment tube 206. However, in yet another embodiment, the invention stress release process of FIG. 3 is modified to give a further fine tuned invention process according to the illustration shown in FIG. 4. In this embodiment of the invention process, two selected rollers (shown as rollers 8 and 28) are incorporated, one positioned before the heat treatment tube 206 while the other is positioned after the heat treatment tube 206, to effect maximum imaging member stress release ripple/wrinkle elimination outcome. Although labeled in FIG. 4 as two different rollers 8, 28, the rollers may either be of the same or of different configuration designs. Thus, for example with reference to the embodiments shown in FIGS. 5 and 6, the rollers 8,28 in FIG. 4 can both be concave/reversed crown rollers; the rollers 8,28 in FIG. 4 can both be flexible spreader rollers; one of the rollers 8,28 can be a concave/reversed crown roller, while the other roller 8,28 is a flexible spreader roller; or one or both of the rollers 8,28 in FIG. 4 can be a roller of a type that provides the desired results, described above.

However, from the above discussion, it will be apparent that a flat, constant diameter, solid roller, such as a guiding roller, will not provide the desired wrinkle-reduction properties. Such conventional rollers, while helpful in guiding the web stock material in its progress through the treatment process, do not accommodate the spontaneously created transverse tension force, and thus do not assist in wrinkle reduction or prevention.

The component 206 defining the arcuate surface may have an outer diameter or width ranging for example from about 0.5 inch to about 5 inches, particularly from about 0.5 inch to about 1 inch. However, it will be apparent that other diameter components can be used without diverging from the scope of the invention.

As the member 10 advances into the heating region of the member path, a heating source 103 heats sequentially each portion of the surface layer to a temperature above the glass transition temperature while in the curved contact zone region. The heating occurs only in the heating region 108 of the member path. The phrase "heating region" refers to the area of the member path receiving heat from the heating source, such an area encompassing any part or all of the contact zone outside the cooling region and a portion of the pre-contact member path adjacent the contact zone.

Figure 4:
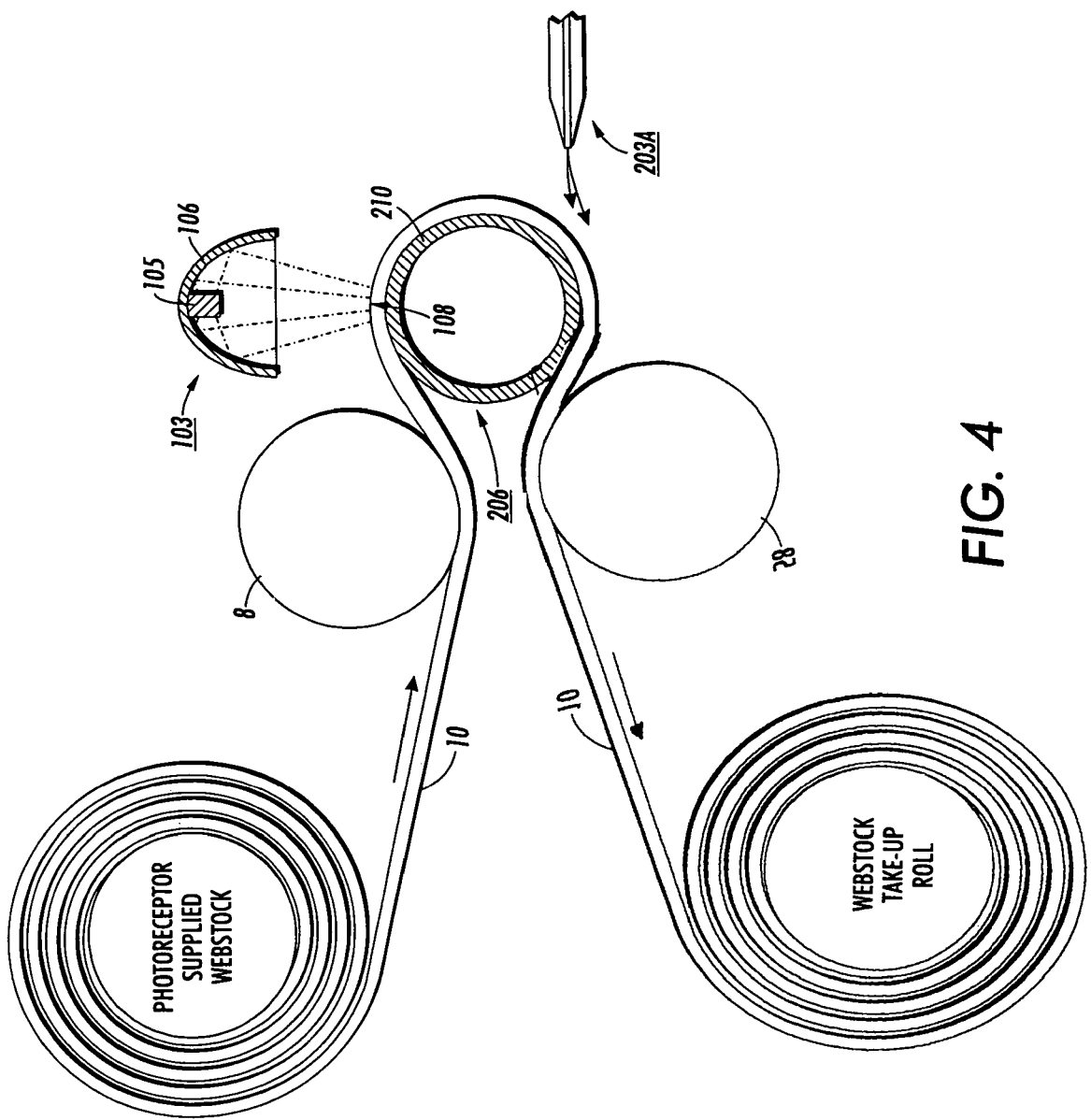
FIG. 4 shows a schematic representation of another embodiment of the present invention.

In the depicted embodiments of FIGS. 3 and 4, the heating source 103 is a high power infrared emitting tungsten halogen quartz lamp, positioned directly above the member to bring an instant localized temperature elevation in the surface layer. In embodiments, the heating source 103 is an integrated unit having a length covering the width of the member 10 and consisting of a hemi-ellipsoidal shaped cross-section elongated reflector 106 and a halogen quartz tube 105 positioned at a focal point inside the reflector 106, such that all the infrared radiant energy emitted from tube 105 is reflected and converges at the other focal point outside the reflector 106 to give a focused heating line at the heating region 108 to quickly bring about temperature elevation. The heating region provided by for example the focused heating line may range in width (that is, in the direction of member movement) from about 3 mm to about 1 cm, particularly from about 6 mm to about 12 mm. Alternatively, the heating source may be a laser such as a carbon dioxide laser. Any other suitable heating sources can also be used.

The heating raises each of the heated surface layer portions to a temperature ranging from about 5 to about 40° C. above the glass transition temperature, particularly from about 10 to about 20° C. above the glass transition temperature. The electrical power input to the heating source can be adjusted incrementally to produce the desired heat energy output. The temperature of the member can be monitored with an infrared camera.

The present method then cools sequentially each of the heated surface layer portions while in the contact zone such that the temperature of each of the heated surface layer portions falls to below the glass transition temperature prior to each of the heated surface layer portions exiting the curved contact zone region, thereby defining a cooling region. The phrase "cooling region" refers to the area of the member path after the heating region and before the post-contact member path, even including any place where the temperature of the surface layer portions has not yet fallen below the glass transition temperature. It is apparent that the "cooling region" excludes any place in the member path subjected to heating by the heating source.

After advancing into the cooling region, each of the heated surface layer portions after exposure to the heating source 103 will then quickly cool down when the member is transported away from the heat source 103, through for instance direct heat conduction away from the member to component 206 as well as heat convection to the ambient air (due to movement of the member along the member path). A final cooling down can be achieved by an optional cooling system, such as a free rotating soft hydrophilic foam roll, an air impinging knife, or a coolant such as sub-cooled water, liquid nitrogen, alcohol and the like, passed through the annular chamber 209. In FIG. 3, cooling is achieved using an air impinging knife 203A and a coolant passed through the annular chamber 209.

Besides air, cooling by cooling system 203A may also be achieved by using impinging $CO_2$ snow, super-cooled nitrogen gas, liquid water, or alcohol and the like. Since impinging air, nitrogen, $CO_2$, liquid alcohol, or liquid water is a forced convection cooling process, the impinging cooling medium can quickly bring the temperature of the heated surface layer portions down to below the Tg. The temperature of the impinging cooling medium, if gaseous, can range for example from about −10° C. to about 20° C., particularly from about −5° C. to about 5° C. However, for a high heat conducting liquid such as water or alcohol, the temperature of the impinging liquid is for example from about 2° C. to about 25° C., particularly from about 5° C. to about 10° C.

In a modification, of the method and apparatus, the air impinging knife 203A can be replaced by a free rotating soft hydrophilic foam roll (saturated with a cooling liquid). Such a cooling roller is described in U.S. Patent Publication No. 20030067097, the entire disclosure of which is incorporated herein by reference. In this embodiment, the cooling roller makes compression contact with the member at a position spanning about 4 O'clock to about 6 O'clock to assure temperature lowering of the exiting surface layer portions to a temperature of at least about 20° C., particularly at least about 40° C.) below the glass transition temperature to yield permanent stress or strain release. In this embodiment of the cooling system, the hydrophilic cooling roll can be a soft idling foam roll having a free rotating axial shaft and partially submersed, but totally saturated, in a cooling liquid bath (e.g., water, alcohol, and the like, or a mixture thereof) to provide effective cooling result. The temperature of the cooling liquid bath ranges for example from about 0 to about 25° C., particularly from about 5 to about 10° C.

In addition, as described above, the annular chamber 209 of the treatment component 206 can include just air at ambient temperature; or a coolant such as sub-cooled water, liquid nitrogen, alcohol and the like, can be passed through the annular chamber 209. The temperature of the water and/or alcohol coolant passing through the chamber ranges for example from about 0 to about 25° C., particularly from about 5 to about 10° C.

In embodiments, to enhance the stress or strain release effect of the present method, the member can be transported through the member path at a speed described herein such that the heat extraction from the member by the cooling mechanism is effectual to bring down the temperature of each of the surface layer portions to significantly lower than the Tg prior to each of the surface layer portions exiting the curved contact zone region.

Thus, as discussed herein, cooling can include transferring heat away from the member via heat conduction through the arcuate surface and also via heat convection to ambient air (e.g., forced heat convection using for example a fan or natural heat convection). In embodiments, cooling further includes transferring heat away from the member via heat conduction or heat convection to a coolant other than ambient air. In other embodiments, cooling is accomplished by relying only on transferring heat away from the member via heat conduction through the arcuate surface and/or via heat convection to ambient air, without transferring heat away from the member via heat conduction or heat convection to a coolant other than ambient air, i.e., cooling system 203A is absent in certain embodiments.

The heating and cooling features of the present method are discussed with respect to the surface layer whether that is the top layer or the bottom layer of the member. Due to the phenomenon of heating conduction, however, the heating and cooling of the surface layer may affect any layer or layers above or below the surface layer in a manner similar to the heating/cooling experienced by the surface layer. So the present method can be used in embodiments to treat via heat conduction other layer or layers of the member in addition to the surface layer. To treat one or more additional layers where each layer has a glass transition temperature different from that of the surface layer, one applies sufficient heat to the member in the heating region to heat the surface layer and the additional layer(s) to above the highest glass transition temperature of the various layers targeted for stress release. Then, according to the present method, one cools in the cooling region the surface layer and the additional layer(s) to below the lowest glass transition temperature of the various layers targeted for stress release.

In certain embodiments, where the surface layer has a Tg higher than the Tg of an adjacent layer and the adjacent layer is the layer targeted for stress release, the present method applies heat in the heating region to heat the surface layer and the adjacent layer to a temperature that exceeds the Tg of the adjacent layer; it is optional to make the temperature exceed the Tg of the surface layer as well if the surface layer is not targeted for stress release. Then, one cools in the cooling region the surface layer and the adjacent layer to below the Tg of the adjacent layer.

Thus, in embodiments, the member further includes an additional layer, wherein there occurs the following: (1) due to heat conduction within the member, the heating sequentially of each portion of the surface layer also causes heating sequentially of each portion of the additional layer such that each of the heated additional layer portions has a temperature above the glass transition temperature while in the curved contact zone region; and (2) wherein due to heat conduction within the member, the cooling sequentially of each of the heated surface layer portions also causes cooling sequentially of each portion of the additional layer such that the temperature of each of the heated additional layer portions falls to below the glass transition temperature prior to each of the heated additional layer portions exiting the curved contact zone region.

The glass transition temperatures of the various layers of the member can differ by a value ranging for example from about 5 to about 30° C., particularly from about 10 to about 20° C.

The member may be any flexible multi-layer component that can be cycled over one or more rollers. The member can be an imaging member such as an electrostatographic imaging member, and especially an electrophotographic imaging member (e.g., photoreceptor). In other embodiments, the member can be a conveyor belt, an intermediate image transfer belt, or the like.

In embodiments, the member is moved at a constant speed along the member path including through the contact zone. The phrase "constant speed" means steady movement without stop and go movement, pausing or varying the speed. In other embodiments, the member is moved at a non-constant speed along the member path including through the contact zone. The phrase "non-constant speed" means stop and go movement, pausing or varying the speed. Each pause may last for example from about 3 seconds to about 1 minute. The member may be subjected to the present method one, two, or more times; in embodiments, the member is subjected to the present method only one time.

The present method reduces or eliminates the built-up internal tension strain within the member, thereby providing any or all of the following benefits: (1) eliminates or reduces edge curling; (2) surface layer cracking life extension; (3) renders optional the use of an anticurl backing layer for an imaging member; and very importantly (4) total elimination of web stock ripple/wrinkle associated streak defects copy printout problem.

Additional processing of the member can occur using conventional techniques. For example, where the member is an imaging member web-stock, one can form a seamed imaging belt using the joining techniques described for example in U.S. Pat. No. 5,688,355, the disclosure of which is totally incorporated herein by reference.

For electrographic imaging members, a flexible dielectric layer overlying the conductive layer can be substituted for the active photoconductive layers. Any suitable, conventional, flexible, electrically insulating, thermoplastic dielectric polymer matrix material may be used in the dielectric layer of the electrographic imaging member. If desired, the flexible belts preparation methods of embodiments can be applied to other purposes in which belt cycling durability, such as against fatigue surface cracking, is an important issue.

The invention will further be illustrated in the following non-limiting examples, it being understood that these examples are intended to be illustrative only and that the invention is not intended to be limited to the materials, conditions, process parameters and the like recited herein. All proportions are by weight unless otherwise indicated.

EXAMPLES

Control Example I

A flexible electrophotographic imaging member web stock, in reference to the illustration in FIG. 1, is prepared by providing a 0.01 µm thick titanium layer 30 coated onto a flexible biaxially oriented Polynaphthalate substrate support layer 32 (Kadalex®, available from ICI Americas, Inc.) having a thermal contraction coefficient of about $1.8 \times 10^{-5}/°C.$, a glass transition temperature Tg of 130° C., and a thickness of 3.5 mils or 88.7 µm, and applying thereto, by a gravure coating process, a solution containing 10 grams gamma aminopropyltriethoxy silane, 10.1 grams distilled water, 3 grams acetic acid, 684.8 grams of 200 proof denatured alcohol and 200 grams heptane. This layer is then dried at 125° C. in a forced air oven. The resulting blocking layer 34 has an average dry thickness of 0.05 µm measured with an ellipsometer.

An adhesive interface layer is extrusion coated by applying to the blocking layer a wet coating containing 5 percent by weight based on the total weight of the solution of polyester adhesive (Mor-Ester 49,000®, available from Morton International, Inc.) in a 70.30 volume ratio mixture of tetrahydrofuran/cyclohexanone. The resulting adhesive interface layer 36, after passing through an oven, has a dry thickness of 0.095 µm.

The adhesive interface layer 36 is thereafter coated with a photogenerating layer 38. The photogenerating layer dispersion is prepared by introducing 0.45 grams of IUPILON 2000 poly(4,4'-diphenyl)-1,1'-cyclohexane carbonate, available from Mitsubishi Gas Chemical Corp and 50 mL of tetrahydrofuran into a glass bottle. To this solution is added 2.4 grams of Hydroxygallium Phthalocyanine and 300 grams of ⅛ inch (3.2 mm) diameter stainless steel shot. This mixture is then placed on a ball mill for 20 to 24 hours. Subsequently, 2.25 grams of poly(4,4'-diphenyl)-1,1'-cyclohexane carbonate is dissolved in 46.1 grams of tetrahydrofuran, then added to this hydrogallium phthalocyanine slurry. This slurry is then placed on a shaker for 10 minutes. The resulting slurry is, thereafter, extrusion coated onto the adhesive interface 36 by extrusion application process to form a layer having a wet thickness of 0.25 mL. However, a strip about 10 mm wide along one edge of the substrate web bearing the blocking layer and the adhesive layer is deliberately left uncoated by any of the photogenerating layer material to facilitate adequate electrical contact by the ground strip layer that is applied later. This photogenerating layer is dried at 135° C. for 5 minutes in a forced air oven to form a dry thickness photogenerating layer 38 having a thickness of 0.4 µm layer.

This coated imaging member web is simultaneously coextrusion overcoated with a charge transport layer 40 and a ground strip layer 41. The charge transport layer is prepared by introducing into an amber glass bottle a weight ratio of 1:1 N,N'-diphenyl-N,N'-bis(3-methylphenyl)-1,1'-biphenyl-4, 4'-diamine and Makrolon 5705®, a polycarbonate resin having a weight average molecular weight of about 120,000 commercially available from Farbensabricken Bayer A. G. The resulting mixture is dissolved to give a 15 percent by weight solids in 85 percent by weight methylene chloride. This solution is applied over the photogenerator layer 38 to form a coating which, upon drying, gives a charge transport layer 40 thickness of 29 µm, a thermal contraction coefficient of $6.5 \times 10^{-5}/°C.$, and a glass transition temperature, Tg, of about 85° C.

The approximately 10 mm wide strip of the adhesive layer 36 left uncoated by the photogenerator layer 38 is coated with a ground strip layer during a co-coating process. This ground strip layer 41, after drying at 125° C. in an oven and eventual cooling to room ambient, has a dried thickness of about 19 µm. This ground strip is electrically grounded, by conventional means such as a carbon brush contact means during conventional xerographic imaging process. The electrophotographic imaging member web stock, at this point if unrestrained, would spontaneously curl upwardly into a tube due to the thermal contraction mismatch between the charge transport layer 40 and the substrate support layer 32, resulting in greater charge transport layer 40 dimensional shrinkage than the substrate support layer 32 which thereby causing substantial internal stress built-in in the charge transport layer 40. The curled electrophotographic imaging member web stock is used to serve as a control.

Control Example II

Another flexible electrophotographic imaging member web stock is prepared by following the procedures and using materials as described in the Control Example I, but with the exception that the imaging member web stock curling is controlled by application of an anticurl back coating 33 to render the desired imaging member web stock flatness.

An anticurl back coating solution is prepared by combining 8.82 grams of polycarbonate resin (Makrolon 5705®, available from Bayer AG), 0.72 gram of polyester resin (Vitel PE-200®, available from Goodyear Tire and Rubber Company) and 90.1 grams of methylene chloride in a glass container to form a coating solution containing 8.9 percent by weight solids. The container is covered tightly and placed on a roll mill for about 24 hours until the polycarbonate and polyester are dissolved in the methylene chloride to form the anticurl back coating solution. The anticurl back coating solution is then applied to the rear surface of the substrate support layer 32 (the side opposite the photogenerator layer and charge transport layer) of the imaging member web stock and dried at 125° C. to produce a dried anticurl back coating 33 thickness of about 17.5 µm. The resulting electrophotographic imaging member web stock has the desired flatness and with the same material structure as that schematically illustrated in FIG. 1 is a complete imaging member full device. The fabricated electrophotographic imaging member web stock is also used to serve as another imaging member control.

Comparative Example I

The flexible electrophotographic imaging member web stock 10 full device of Control Example II is used for charge transport layer (CTL) heat stress release processing treatment according to the pictorial representation of FIG. 2. This concept, corresponding to the conventional heat stress release process, intents to reduce the internal stress in CTL 40, through this continuous web stock heat treatment processing.

In essence, the imaging member web stock 10 is unwound from a 6,000 feet roll-up imaging member supply roll and is directed (with the CTL 40 facing outwardly, under a one pound per linear inch width web tension, and a web stock transport speed of 10 feet per minute) toward a one-inch outer diameter free rotation processing treatment metal tube 206 having an arcuate outer surface 210, a wall thickness, and an annulus 209. The imaging member web stock 10, under 25° C. ambient temperature, makes an entering contact at 12 o'clock with the tube 206 and conformed to the arcuate surface 210. A powerful infrared emitting tungsten halogen quartz heating source 103, positioned directly above, brings upon an instant localized temperature elevation to the CTL 40 to 10° C. above its $T_g$ to facilitate molecular motion and effect instant stress release from the CTL 40 while the segment of the imaging member web stock 10 is in bending conformance contact over the arcuate surface 210. The heating source 103 is an integrated unit having a length sufficiently covering the whole width of the imaging member segment; it consists of a hemi-ellipsoidal cross-section elongated reflector 106 and a halogen quartz tube 105 positioned at one focal point inside the reflector 106 such that all the infrared radiant energy emitted from tube 105 is reflected and converged at the other focal point outside the reflector 106 to give a 6 mm width focused heating line 108 that effects instant CTL 40 temperature elevation beyond its $T_g$.

The heated segment of CTL 40 after exposure to the heating line 108 begins to cool down, through direct heat conduction to tube 206 and heat transfer to ambient air, as the imaging member web stock in constant motion is transported away from heat source 103. A further and final CTL 40 cooling is assured by air an impingement from an air knife positioned at 4 o'clock to the tube 206 prior to imaging member web stock segment 10 emerging from tube 206 to complete the treatment process. In this charge transport layer stress release processing treatment experimental demonstration, two different imaging member transporting speeds, a 7 feet/min. and a 15 feet/min., are tried to assess invention processing effectiveness.

The result is the formation of a roll of imaging member web stock material that is heat stress released at either web stock transport speed. However, inspection of the resultant web stock material under 100× magnification shows the formation of wrinkles in the outer layers, which appear as streak defects in print out copy.

Comparative Example II

The flexible electrophotographic imaging member web stock having no anticurl back coating layer, prepared according to Control Example I, is also subjected to the same CTL stress release processing treatment procedures by following the descriptions in the preceding Comparative Example I, again using same two different imaging member web stock transporting speeds.

The result is the formation of a roll of imaging member web stock material that is heat stress released, as described in Comparative Example I, is now free of cross web curling. However, inspection of the resultant web stock material again shows the formation of wrinkles in the outer layers and with streak defects manifestation in copy print out.

Example I

A two hundred feet long flexible electrophotographic imaging member web stock 10 full device of Control Example II is used for charge transport layer (CTL) heat stress release processing treatment according to the pictorial representation shown in FIG. 3. This processing follows the same procedures as in Comparative Example I, except that the processing is modified to include a concave idled roller 8 as shown in FIG. 3, according to the present invention. A second two hundred feet long imaging member web stock 10 of Control Example II is also used for CTL stress release processing treatment according to the invention process of FIG. 4, but utilizing two identical concave rollers 8, 28. The concave rollers 8, 28 are as that illustrated in FIG. 5, particularly having a 3 inch diameter at the roller center and with larger diameters at each end, to give a diameter differential of 0.015 inch. These two imaging member web stocks are each separately stress release treated, according to the respective process of FIGS. 3 and 4, and using the same transporting speed of about 12 ft/min.

The result is the formation of two 200 hundred feet long imaging member web stock materials that are heat stress released. Inspection of the resultant web stock material 100× magnification shows that the formation of wrinkles in the outer layers is avoided. The present invention stress release treated imaging member materials thus produced have no wrinkles and free of streak defects in print out copy as well, as compared to the wrinkled material which are through with stress release treatment by following the prior art process of FIG. 2 described in Comparative Example I. The results obtained confirm that utilizing the present invention process according to the illustration of either FIG. 3 or FIG. 4 does provide effectual CTL stress release result and resolve the ripple/wrinkle associated streak copy print defects issue.

Mechanical Belt Cycling Test Example

The flexible electrophotographic imaging member web stocks of Control Examples I and II, along with Comparative Examples I and II and Example I are each cut to precise dimensions of 440 mm width and 2,808 mm in length. The opposite ends of each cut imaging member sheet are secured to give 1 millimeter overlap and ultrasonically welded, using 40 KHz horn frequency, in the long dimension, to form a seamed flexible imaging member belt for fatigue dynamic electrophotographic imaging test in a selected xerographic machine utilizing a belt module comprises numerous belt support rollers, in particular a small one inch diameter paper stripping roller.

The dynamic machine belt cycling test results obtained showed that early onset of fatigue induced charge transport layer cracking is found to be evident much earlier for both control imaging member belts prepared directly from Control Examples I and II than those seen for all the corresponding stress release processing treated imaging member belt counterparts of the Comparative Examples I and II and Example I, which have been through stress release processing treatment. Delaying of fatigue charge transport layer cracking is realized and effected by subjecting the imaging member web stock through stress release processing treatment of embodiments. These fatigue cycling belt life results obtained from machine belt cycling and the copy print out testing are a definite indication that only the imaging member belts, fabricated from web stocks through the stress release processing treatment condition according to the present invention, do provide robust mechanical function as well as resolving the streak defect copy printout problem, to meet the imaging member belt life extension goal.

In summary, the integration of an appropriate idled roller in the invention process is advantageous and represents an effectual improvement over the prior art in achieving electrophotographic imaging member web stock stress release outcome.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A stress/strain relief process for a flexible, multilayered web stock comprising:
   providing a multilayered web stock including at least one layer to be treated, the at least one layer to be treated having a coefficient of thermal expansion significantly differing from a coefficient of thermal expansion of another layer;
   passing the multilayered web stock at a continuous speed over and in contact with a first concave or reversed-crown wrinkle-reducing roller that spontaneously creates transverse tension stress in the at least one layer to be treated;
   passing the multilayered web stock at a continuous speed over and in contact with a processing tube, wherein at least one heat source heats the at least one layer to be treated above a glass transition temperature $T_g$ of the at least one layer to be treated to thereby create a heated portion of the at least one layer to be treated, a portion of the web stock in proximity to the heated portion of the at least one layer to be treated thereby becoming a heated portion of the web stock;
   inducing curvature in the heated portion of the web stock; and
   cooling the heated portion of the web stock at said curvature by directing a cooling stream at the heated portion of the web stock,
   wherein the first wrinkle-reducing roller has a center diameter from about 1 to about 4 inches and a differential diameter between ends of the roller and a center of the roller of from about 0.002 to about 0.1 inch,
   wherein the first wrinkle-reducing roller offsets and suppresses web stock micro ripple formation induced by the processing tube.

2. The process of claim 1, wherein cooling comprises providing an air knife to direct a cooling stream at the heated portion of the web stock.

3. The process of claim 1, wherein providing at least one heat source includes positioning an infrared lamp in proximity to the web stock, and placing a reflector around the infrared lamp to focus energy emitted by the infrared lamp into a heating line on a surface of the web stock.

4. The process of claim 1, wherein the first wrinkle-reducing roller is a flexible spreader roller.

5. The process of claim 4, wherein the first wrinkle-reducing roller has a diameter of between about 0.8 and about 2 inches.

6. The process of claim 1, wherein the first wrinkle-reducing roller is located in the process prior to the heating step.

7. The process of claim 1, further comprising passing the multilayered web stock at a continuous speed over and in contact with a second wrinkle-reducing roller that spontaneously creates transverse tension stress in the at least one layer to be treated,
   wherein the first wrinkle-reducing roller is located in the process prior to the heating step, and the second wrinkle-reducing roller is located in the process subsequent to the heating step.

8. The process of claim 7, wherein the first wrinkle-reducing roller and the second wrinkle-reducing roller are the same.

9. The process of claim 7, wherein the first wrinkle-reducing roller and the second wrinkle-reducing roller are different.

10. The process of claim 1, wherein inducing curvature includes moving the web stock at a continuous speed over an arcuate portion of an outer surface of a processing treatment cylinder.

11. A stress/strain relief process for a flexible, multilayered web stock including:
    providing a multilayered web stock including at least one layer to be treated, the at least one layer to be treated having a coefficient of thermal expansion significantly differing from a coefficient of thermal expansion of another layer;
    providing a first concave or reversed-crown wrinkle-reducing roller;
    moving the web stock at a continuous speed toward the first wrinkle-reducing roller;
    passing the multilayered web stock at a continuous speed over and in contact with the first wrinkle-reducing roller to spontaneously create transverse tension stress in the at least one layer to be treated;
    providing a processing tube having an arcuate outer surface;
    moving the web stock at a continuous speed toward the processing tube;
    providing a heat source at the processing tube; and
    heating the web stock above a glass transition temperature $T_g$ of the at least one layer to be treated,
    wherein the first wrinkle-reducing roller has a center diameter from about 1 to about 4 inches and a differential diameter between ends of the roller and a center of the roller of from about 0.002 to about 0.1 inch
    wherein the first wrinkle-reducing roller offsets and suppresses web stock micro ripple formation induced by the processing tube.

12. The process of claim 11, wherein the at least one layer to be treated includes a charge transport layer.

13. The process of claim 11, wherein providing the web stock includes providing a roll of web stock and the method further comprises unwinding the web stock from the roll with the at least one layer to be treated facing outwardly.

14. The process of claim 11, wherein the first wrinkle-reducing roller is a flexible spreader roller.

15. The process of claim 11, wherein the first wrinkle-reducing roller is located in the process prior to the processing tube in a processing direction.

16. The process of claim 11, further comprising:
    providing a second wrinkle-reducing roller;
    moving the web stock toward the second wrinkle-reducing roller at a continuous speed;
    passing the multilayered web stock over and in contact with the second wrinkle-reducing roller to spontaneously create transverse tension stress in the at least one layer to be treated;
    wherein the first wrinkle-reducing roller is located in the process prior to the processing tube in a processing direction, and the second wrinkle-reducing roller is located in the process subsequent to the processing tube in a processing direction,
    wherein the first wrinkle-reducing roller and the second wrinkle-reducing roller offset and suppress web stock micro ripple formation induced by the treatment tube.

17. The method of claim 11, wherein the web stock is passed over and contacted with the first wrinkle-reducing roller such that the at least one layer to be treated faces an outer surface of the first wrinkle-reducing roller.

18. The method of claim 11, wherein heating the web stock comprises substantially instantly elevating a localized temperature of the at least one layer to be treated at the processing tube.

19. The method of claim 18, wherein elevating a localized temperature of the at least one layer to be treated includes heating the at least one layer to between about 5 °C. and about 25 °C. above a glass transition temperature $T_g$ of the at least one layer.

20. The method of claim 11, wherein providing a heat source includes providing an infrared lamp and providing a reflector, the infrared lamp extending over an entire width of the web stock.

21. The method of claim 20, wherein providing a reflector comprises a providing a hemi-ellipsoidal reflector.

22. The method of claim 21, wherein providing an infrared lamp includes positioning the infrared lamp at a focal point of the reflector such that substantially all infrared radiant energy emitted from the lamp is reflected and converges at a second focal point of the reflector in a heating line of sufficient width to cover substantially an entire width of the web stock.

23. The method of claim 11, further comprising cooling the at least one layer after heating.

24. The method of claim 23, wherein cooling comprises lowering a temperature of the at least on layer by at least about 20 °C. below the $T_g$ of the at least one layer.

* * * * *